May 24, 1949.   R. J. BURROWS ET AL   2,470,885
RESILIENT WHEEL
Filed Nov. 1, 1946.
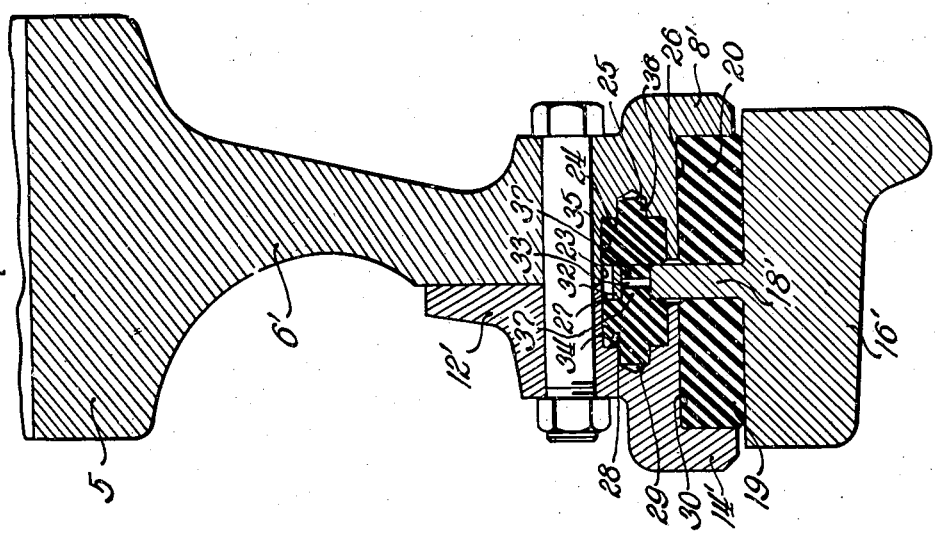
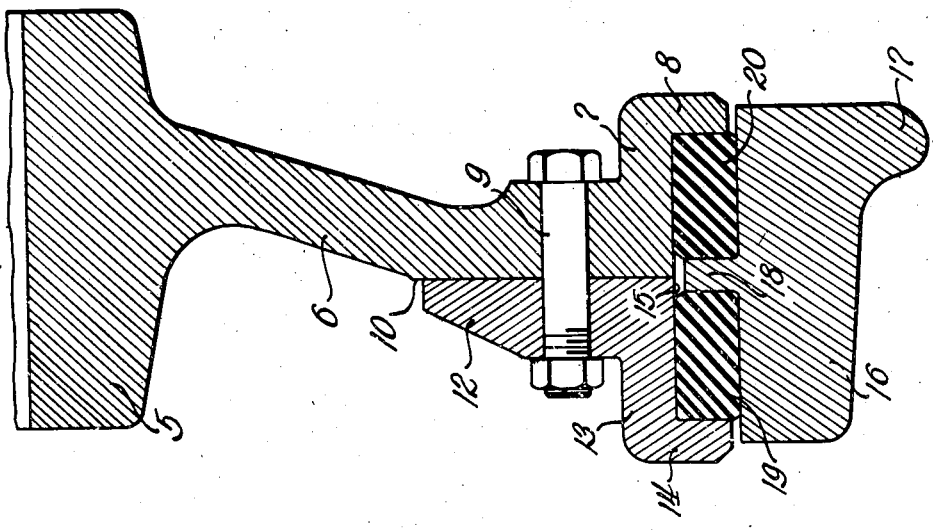
Inventors
Robert J. Burrows
Alfred O. Williams
By Walter E. Schirmer
Atty.

Patented May 24, 1949

2,470,885

UNITED STATES PATENT OFFICE 2,470,885

RESILIENT WHEEL

Robert J. Burrows and Alfred O. Williams, Battle Creek, Mich., assignors to Clark Equipment Company, Buchanan, Mich., a corporation of Michigan Application November 1, 1946, Serial No. 707,184

5 Claims. (Cl. 295—11)

The present invention relates to resilient wheels and more particularly is concerned with a resilient wheel for use on rail trucks, such as in conjunction with streetcars, interurban cars and the like.

The particular rail wheel of the present invention contemplates providing a construction in which the tire or tread member and the hub member are separated from each other by nonmetallic resilient material such as rubber which is loaded in compression rather than in shear stress as has heretofore been the practice.

Another object of the present invention is to provide a construction of this type in which the rubber elements are substantially uniform in cross-section and comprise two separated resilient annular rings which are so related with respect to the confining surfaces of the hub and rim members as to be restricted against lateral displacement, there being provided only a small mold cavity or pocket into which such rubber can escape, whereby the rubber absorbs the resultant forces between the rim and hub member through compression within the rubber itself.

A still further feature of the present invention is to provide a construction of this type in which a balanced design is obtained and in which the rubber members or rings are interchangeable in the construction thereby reducing the cost of the construction by requiring only one die for producing the rubber ring.

In a modified form of the invention, we have also provided a construction in which the rim and hub member are so arranged with respect to annular rubber rings that the rubber rings provide anchoring means for preventing relative circumferential displacement between the rim and hub member by resilient anchors provided on the annular rubber rings and projecting into suitable circumferentially spaced cavities formed in the rim and hub member.

Other objects and advantages of the present construction will appear more fully from the following detailed description, which, taken in conjunction with the accompanying drawings, will disclose to those skilled in the art, the particular construction and operation of a preferred form of the present invention.

In the drawings:

Figure 1 is a sectional view through a portion of a wheel assembly embodying the present invention; and Figure 2 is a corresponding sectional view through a modified form of wheel construction.

Referring now in detail to Figure 1, there is provided the hub member 5 adapted to be pressed onto a car axle or the like and having the radially extending spider or disc portion 6 terminating at its outer end in a laterally extending portion 7 provided with a radially extending terminating flange 8. The spider section 6, adjacent the lateral portion 7 is provided with a second reinforced portion adapted to receive the stud 9 which extends laterally therethrough and which serves to bolt to the face 10 of the spider 6, an annular clamp ring 12 wich clamp ring is provided with a corresponding laterally off-set portion 13 in line with the off-set portion 7 of the spider and with a terminating radially outwardly directed flange 14.

Between the flanges 14 and 8, the wedge clamp ring 12 and the spider 6 form an outwardly directed U-shaped channel indicated generally at 15, which channel is defined at its ends by the flanges 8 and 14.

Circumferentially surrounding the channel 15 is the rim or tire member 16 which is adapted to engage the rail or tracks upon which the vehicle is adapted to move. The member 16 has the usual rail flange 17 and is also provided substantially centrally thereof with the radially inwardly extending flange 18 which flange serves to divide the channel 15 into two sections, flange 18 being spaced slightly radially away from the inner annular surface of the channel 15.

Interposed between the rim member 16 and the spider member 6, there is provided two annular rubber rings 19 and 20. These two rings are of similar form but are reversed in position and are disposed in the divided portion of the channel on opposite sides of the radially inwardly extending flange 18 and the tire member 16.

In the assembly of the wheel, the rubber rings 19 and 20 are first secured in position on the tire member 16 on opposite sides of the flange 18.

With the wedge ring 12 removed, the tire assembly is moved into position so that the ring 20 engages against the shoulder 8 of the spider member 6. The wedge or clamp ring 12 is then moved into position and bolted up tight against the face 10 of the spider. This provides for lateral compression of the members 19 and 20 and also serves to confine these members within the two annularly extending cavities formed by the flanges 8, 14 and 18. As a result, the rubber rings 19 and 20 are preloaded in compression and because of the relatively small opening between the radial outer surface of the flanges 8 and 14 and the inner annular surface of the tire member 16, the rubber is confined against lateral expansion outwardly in this direction. The same is true in the radial space between the inner annular edge of the flange 18 and the face portion of the channel 15. As a result, since the rubber is confined against movement, it is obvious that stresses imposed thereon due to relative movement radially between the hub and tire member are absorbed within the wheel by compression of the rubber rings 19 and 20.

In the embodiment of the invention as shown in Figure 2, the spider 6' is substantially similar to the spider 6, except that it is provided with a stepped annular shoulder 23 which terminates in a radial space 24 provided with a series of circumferentially spaced axial recesses 25. There is then provided a second radially outwardly disposed annular shoulder 26 terminated at the side thereof by the flange 8'.

The clamping ring 12' is formed in a corresponding manner having a first annular shoulder portion 27 terminating in a radial space 28 within which is formed a series of circumferentially spaced openings 29 corresponding to and alined with the openings 25. There is then provided a second radially outwardly disposed annular shoulder 30 terminated by the laterally extending radially outwardly directed flange 14'.

The tire member 16' is similar to the tire member 16 in Figure 1, except that the flange 18' thereof is of greater radially inward extent and is provided adjacent its inner peripheral edge 32 with a series of circumferentially spaced bores 33 adapted to be alined with and spaced similarly to the axial recesses 25 and 29. The bores 23 preferably extend through the flange 18' in an axial direction.

In this construction, the rubber ring members 19 and 20 which are the same as the ring members described in connection with Figure 1, are disposed in the annularly extending openings formed between the radial shoulders 26 and 30 beside flanges 18' and 14' and the intermediate flange 18'. There is also provided however, a second series of radially inwardly disposed rubber rings 34 and 35. The rings 34 and 35 are adapted to be seated within the channel formed by the surfaces 23 and 27 and separated by the radial inward extension of the flange 18'. The rings 34 and 35 are preferably provided with axially extending anchor portions 36 and 37. The portions 36 are adapted to extend into the axially directed recesses 25 and 29 in the spider 6' and the clamping ring 12', while the anchor portions 37 extend into the bore 33 of the flange 18'. Since the anchor members are of relatively large diameter relative to the body members 34 and 35, they become relatively stiff and when the clamp ring 12' is moved into position after the assembly is first moved over against the shoulder 24 and the flange 8', the members 19, 20, 34 and 35 are subjected to initial compression, thereby forcing the anchors 36 and 37 firmly into the recesses 25, 29 and 33. This results in firmly anchoring the ring member 16' against relative circumferential movement relative to the hub member 5. At the same time, relative radial movement between the two members is absorbed by compression set up in the members 19 and 20 and in the members 34 and 35.

It is therefore believed apparent that with this construction, there is provided first means for resiliently supporting the tire member upon the rim member, means for preventing relative circumferential movement therebetween and means for absorbing any relative radial movement through compression of preloaded compressed non-metallic resilient members.

It is of course to be understood that suitable bond means is provided for conducting electric currents from the tire member 16' to the spider member 6' as is the usual practice.

We are aware that certain features of the present construction may be changed without in any way departing from the underlying features of the present invention, and we therefore do not intend to be limited except as defined by the scope and spirit of the append claims:

We claim:

1. A rail car wheel comprising a hub member having a radially extending web terminating in a radially outwardly opening annular channel, a tire member having a central radially inwardly extending flange adapted to be located so as to divide said channel into two parallel annular passageways, individual rubber rings in said passageways for resiliently supporting said tire member on said hub member through compression of said rings, opposed annularly extending axially directed recesses in said hub member disposed radially within said channel and additional rubber rings in said last named recesses on opposite sides of said tire flange.

2. A rail car wheel assembly comprising a hub member having a radially outwardly directed annular channel, opposed axially directed annular channels in said member lying radially within said first channel, circumferentially spaced axial recesses in said second-mentioned channels, a tire member surrounding said first channel and having a central radially inwardly extending flange projecting through said first channel and partially through the radial extent of said axially directed channels, said flange having openings therein in alinement with said recesses, a pair of rubber rings disposed in said first channel on opposite sides of said flange, and a second pair of rings in said axial channels having laterally projecting boss portions on opposite sides thereof projecting into said recesses and into the openings in said flange.

3. The wheel assembly of claim 2 wherein said rings are positioned under initial compression.

4. A rail car wheel comprising a hub member having a radially outwardly directed channel formed of two portions which are axially separable, means for clamping said portions together, a tire member having an inner axially extending annular surface closely overlying the defining sides of said channel and having a central radially inwardly extending flange adapted to divide said channel into two separate annular passageways, separate annular rubber rings in said passageways of a size such as to be subjected to initial compression when said portions of said channel are positioned by said clamping means, recess forming means in said hub member radially inwardly of said channel, and non-metallic resilient means in said last named means interlocking said flange and hub member against relative rotation.

5. A rail car wheel including a hub member and an encircling tire member separated by independent annular rubber rings, means for clamping said rings in position laterally to produce initial radial compression thereof, additional annular rings having circumferentially spaced lateral projections and recess forming means in each of said members for receiving said projections to interlock said members against relative rotation.

ROBERT J. BURROWS.
ALFRED O. WILLIAMS.

REFERENCES CITED

The following references are of record in the file of this patent:

UNITED STATES PATENTS

| Number | Name | Date |
|---|---|---|
| 2,203,965 | Nampa | June 11, 1940 |

FOREIGN PATENTS

| Number | Country | Date |
|---|---|---|
| 16,517 | Great Britain | Sept. 2, 1893 |
| 594,792 | Germany | Mar. 26, 1934 |